March 19, 1957 — A. CHAIMOWICZ — 2,785,854
ELECTRONIC CALCULATING DEVICE
Filed March 26, 1952 — 10 Sheets-Sheet 1

INVENTOR
ADAM CHAIMOWICZ
By:
Hazeltine, Lake & Co.
AGENTS

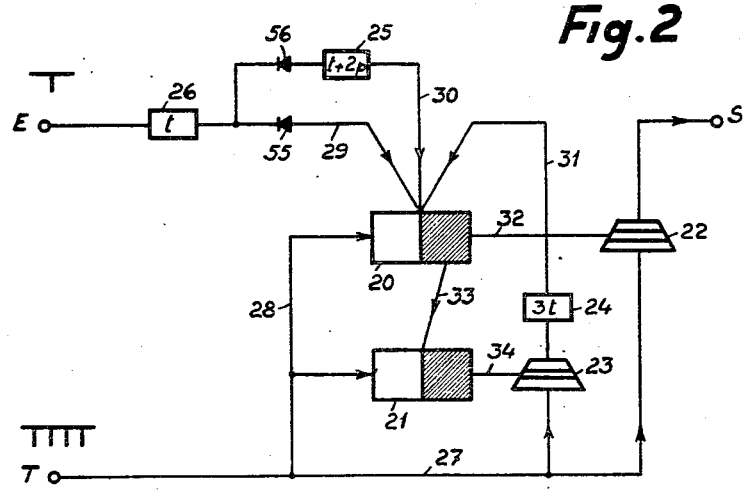

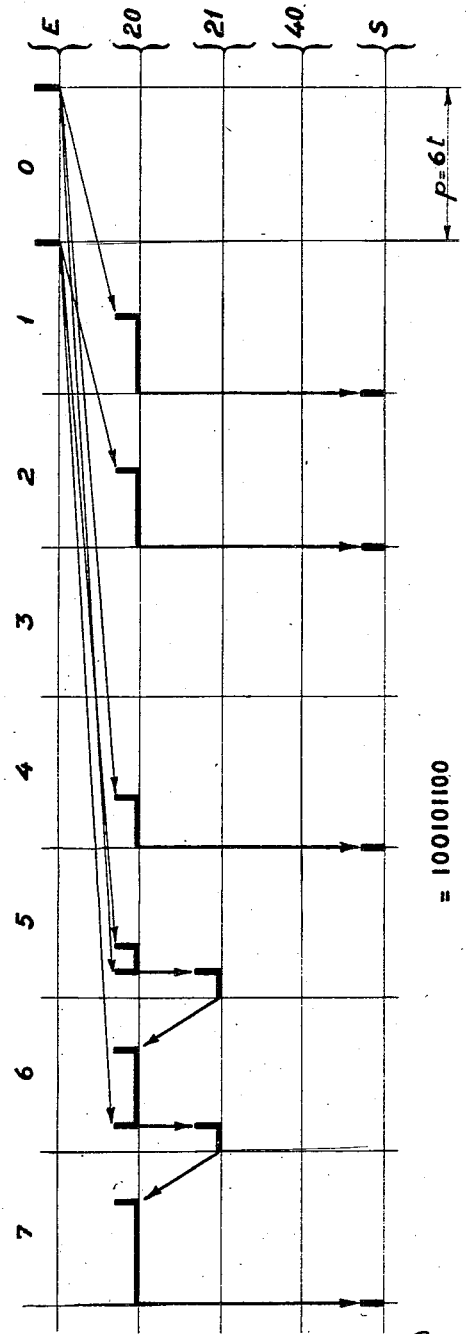

March 19, 1957     A. CHAIMOWICZ     2,785,854
ELECTRONIC CALCULATING DEVICE
Filed March 26, 1952     10 Sheets-Sheet 7
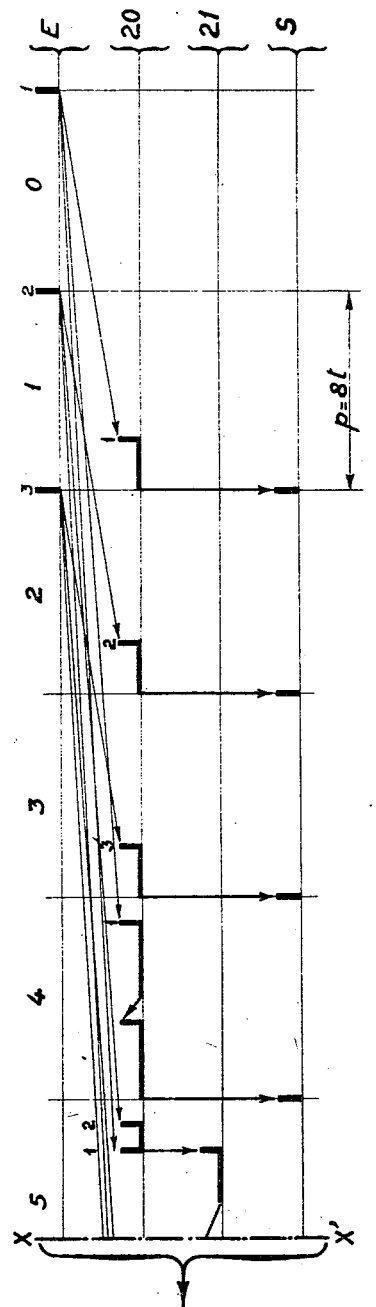
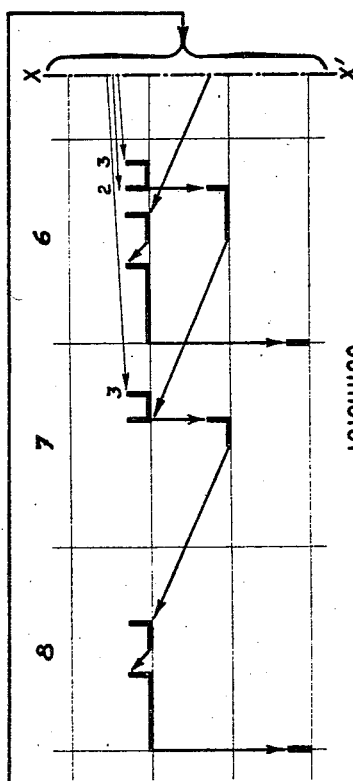
Fig. 4a
Inventor
Adam Chaimowicz
By:
Haseltine, Lake & Co.
Agents INVENTOR
Adam Chaimowicz
By:
Haseltine, Lake & Co.
AGENTS INVENTOR
ADAM CHAIMOWICZ
BY:
Hazeltine, Lake & Co.
AGENTS

United States Patent Office 2,785,854
Patented Mar. 19, 1957

2,785,854

ELECTRONIC CALCULATING DEVICE

Adam Chaimowicz, Paris, France, assignor to Compagnie des Machines Bull (Societe Anonyme), Paris, France Application March 26, 1952, Serial No. 278,649

Claims priority, application France March 30, 1951

4 Claims. (Cl. 235—61)

The present invention is concerned with the treating of electrical pulses called coded-pulses, i. e. which appear successively and regularly in the form: $a_0 2^0$, $a_1 2^1$, $a_2 2^2$ ... $a_n 2^n$; the sum $a_0 2^0 + a_1 2^1 + a_2 2^2 + \ldots a_n 2^n$ representing a determined number in binary notation the parameters $a_0, a_1 \ldots a_n$ of which may assume either the value 0 or 1.

Devices of this sort work, on a time basis, on the different binary denominations of a number, each binary denomination being spaced from the preceding one by a time space of duration $p$. The beginnings of the successive binary time spaces $p$ are marked by signals of a regular rhythm (called timing) which are applied in a preferably negative form to a particular input of each of said devices.

In the following description, said time space will be called "binary period."

The operational quantities represented by binary coded pulses are sent to the subject device with appropriate delay times that are multiples of a submultiple value of the binary period $p$; the object is to avoid simultaneity and consequently any loss or confusion of pulses. The pulses which, in time sequence and after a delay of a binary period $p$, represent the result of the operation to be executed, are collected at the single output of this device. It is obvious that, in order to execute the multiplication of any binary number X, by a whole positive decimal multiplier $m$ which may be as large as desired, it suffices to know how to execute successive multiplications by 1, 2, 3, 4, 5, 6, 7, 8, 9, on one hand and multiplications by 10, 100, 1,000 ... $10^n$ on the other hand (this figure $n$ being a whole positive decimal number as large as required). It can be seen that, in order to execute the multiplication of a number X by a number $m$, it is merely necessary to choose the multiplication to be executed from the above given list and the partial products obtained are then added. For instance, for $m = 2348$, the operations may be separated as follows, it being understood that each operation definitely pertains to one of the two multiplication groups already given:

$$X \times 2348 = X \times 2 \times 1{,}000$$
$$+ X \times 3 \times 100$$
$$+ X \times 4 \times 10$$
$$+ X \times 8$$

Additive or subtractive combinations of suitable powers of 2 provide the means for obtaining the multiplication by whole numbers $m$ differing from exact multiples by 2. Thus in order to obtain:

The multiplication by 3 it is possible to multiply by $2^1 + 2^0$
The multiplication by 5 it is possible to multiply by $2^2 + 2^0$
The multiplication by 6 it is possible to multiply by $2^2 + 2^1$
The multiplication by 7 it is possible to multiply by $2^2 + 2^1 + 2^0$ or $2^3 - 2^0$
The multiplication by 9 it is possible to multiply by $2^3 + 2^0$
The multiplication by 10 it is possible to multiply by $2^3 + 2^1$
The multiplication by 100 it is possible to multiply by $2^6 + 2^5 + 2^2$
The multiplication by 1000 it is possible to multiply by $2^9 + 2^8 + 2^7 + 2^6 + 2^5 + 2^3$ or $2^{10} - (2^4 + 2^3)$, etc. ...

Whenever it is possible to execute these multiplications in several different ways, the simplest combination will naturally be adopted in each case while taking into account elements composing the addition or subtraction operations executed.

It can be seen from the foregoing that by associating delay elements having retardation values equal to one, two, three or more binary periods, respectively, providing the partial multiplication by $2^1$, $2^2$, etc. ... and subtraction or addition operation devices described hereinafter and called "operators" for the sake of brevity, of the type disclosed in the patent application Serial No. 221,775 filed April 19, 1951, it is possible to obtain the desired multiplication. The present invention has the provision of this sort of association for its object.

Another of the objects of the present invention is to provide an operator device for multiplying binary numbers by 1, 2, 3, 4, 5, 6, 7, 8, 9, using a three-term adding operator of known type which includes three stages each composed of a trigger circuit which controls a gate circuit. A device of this sort also includes a series of gate circuits, which allow the pulses to reach the various input members of the aforementioned addition operator at proper instants, and not simultaneously, after having traversed appropriate delay elements. This device according to the invention also includes a connection network with rectifier cells which prevent undesirable mixings of pulses; these rectifier cells connect the various terminals of the control device of the multiplication to the aforementioned gate circuits.

Another object of the present invention is to provide a multiplying device for binary multiplication by 10, henceforth called a "decupler," which uses a two-term addition operator similar to the one described with reference to Figs. 2 or 4 of the aforementioned patent application Serial No. 221,775, the input circuits of this operator being modified so that the two input terminals of the operator can each receive a series of pulses, one series representing the multiplicand number and the other series representing a sub-product of the multiplicand number multiplied by 4, that is by $2^2$, through delay elements which differ from each other by a little more than $2p$, and which are connected between the one input of the multiplying device and said two input terminals. These delay elements provide for the multiplication of the multiplicand by $(2^0 + 2^2)$, that is $X \times 5$, the inherent delay time $p$ of the operator being used to effect the multiplication by 2 or $\times (2^1)$.

Another object of the present invention is to provide a multiplying device for binary multiplication by 100, henceforth called a "centupler" similar to the decupler in its working but comprising an addition operator similar to that of Fig. 5 of the aforementioned application, having three stages each comprising a trigger-gate combination, the three input terminals of this operator being connected to a sole input of the device through delay elements which provide delay times roughly equivalent to $1p$, $4p$ and $5p$ for effecting the multiplication by 50 or $\times (2^1 + 2^4 + 2^5)$, the inherent delay time $p$ of the operator being used to effect the multiplication by 2 or $\times (2^1)$.

Another object of the present invention is to provide a multiplying device for multiplication by 1000, henceforth called a "miltupler," which makes use of a two trigger subtraction operator of known type, but modified so as to allow the application of two successive pulses to the two triggers, these elements being derived from the timing by means of delay elements in the course of a binary period.

More generally a further object of the present invention is to provide multiplying devices for binary multiplication by $10^n$ ($n$ being a whole positive decimal number as high as may be desired) exclusively or partially using known addition and/or subtraction operators, a single input terminal being provided through which pass the binary time-coded digits to be multiplied, these digits being then directed through delay elements appropriate in number and value by branch circuits in corresponding numbers; the result of the multiplication is then collected at a single output terminal and is still in the form of binary digits that are time coded.

The invention has for a further object the provision of combinations of different multiplying devices for executing multiplications by 1, 2, 3, 4, 5, 6, 7, 8, 9 and by the various powers of 10, these devices being of types mentioned above and said combinations of devices being formed with a view towards executing the desired multiplications.

The invention will be more fully explained and understood with reference to the following figures in which:

Fig. 2 represents a multiplying device for multiplication by 10 (decupler).

Fig. 3 illustrates multiplying device for multiplication by 100 (centupler).

Fig. 3a is a time chart for explaining the working of this centupler.

Fig. 4a is a time chart for explaining the working of the latter centupler.

Figure 1:
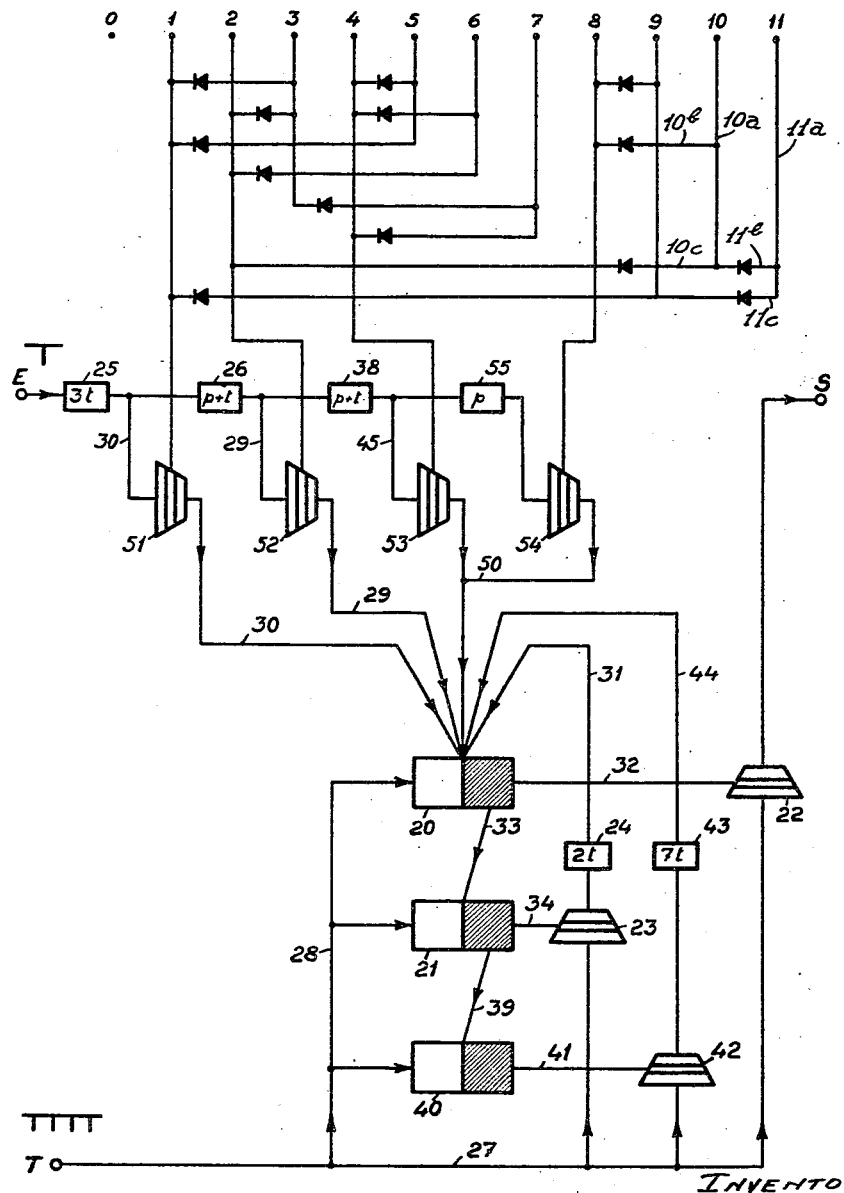
Fig. 1 represents a multiplying device for multiplication by 1 to 9 or by 11.

The multiplying device for multiplication shown in Fig. 1 uses a known addition operator.

Figure 1A:
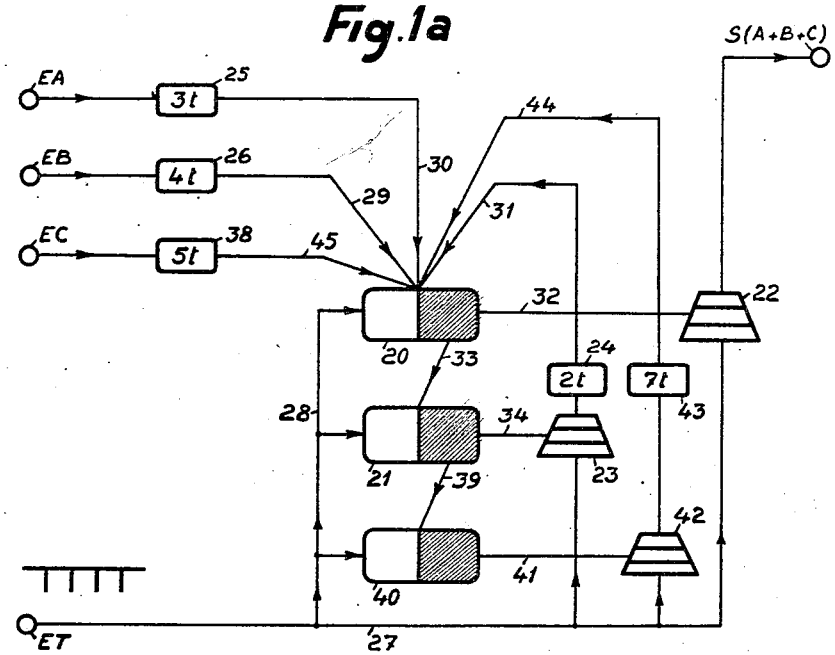
Fig. 1a illustrates a three term addition operator of known type used in a multiplication device.

The latter operator is represented by Fig. 1a. It is hereinafter described. The corresponding parts in Figs. 1 and 1a bear the same reference numbers. The operator of Fig. 1a includes three trigger circuits 20, 21 and 40 of the flip-flop type having two stable states of equilibrium: state "0" (rest condition), and state "1" (working condition). The hatchings which are in the right half of the rectangles schematically representing such triggers indicate that these triggers are in the 0 state.

Each of these triggers controls one of the gate circuits 22, 23 and 42 (preferably made up of electronic tubes). Any of these gates can transmit or cannot transmit the negative pulses propagating along the corresponding channel 27, or 31 or 44 in the direction of the arrows, according to whether the trigger unit connected with this gate is in condition 1 or zero. Channels 31 and 44 respectively forward the carry-over impulses which may occur, through delay lines 24 and 43, to the single input of trigger 20. As known in the art a bi-stable trigger circuit usually is provided with a single input characterized in that a negative pulse applied thereto is able to reverse the state of the trigger irrespective of its previous state. The pulses representing the result of the addition are forwarded to output terminal $S(A+B+C)$.

The triggers 21 and 40 are respectively connected to triggers 20 and 21 by connections 33 and 39 so as to receive a negative pulse upon their respective single inputs only when triggers 20 and 21 respectively change from state "1" to state "0." The addition operator of Fig. 1a includes three inputs EA, EB and EC upon which the coded negative pulses which represent respectively the three possible terms A, B and C to be added, are simultaneously applied. Connections 30, 29 and 45 respectively join the three input terminals EA, EB and EC to the single input of trigger 20 through delay lines 25, 26 and 38, the delay values of which are whole multiples of $$t\left(t=\frac{p}{6}\right)$$

and have been chosen to be different from the values of the delay lines 24 and 43 so as to avoid any interference of the pulses which may reach the trigger 20 through 30, 29 and 45 on the one hand and through 31 and 44 on the other hand.

In the arrangement of Fig. 1a, at the beginning of each binary period $p$, each of the three triggers 20, 21 and 40 is zeroized (that is to say, reset to the zero state) by a negative timing pulse which reaches a reset input of each of them by way of the channel 28. In a bi-stable trigger circuit, the reset input is characterized by the fact that the timing pulse changes the state of this trigger circuit only if the latter already is in state 1. This timing pulse is continued long enough so that zeroizing of a trigger by this pulse will have no reaction on the following trigger (e. g. 20 on 21), that is to say, so that the triggers will always be in the same condition zero after each timing signal. This applies to all addition operators herein considered.

It should be observed that, if one, two or three input pulses are present at the beginning of a binary period, they are received at terminals EA, EB, EC in time coincidence with the arrival of a timing pulse at terminal ET.

The operation of the addition operator of Fig. 1a is hereinafter shown. It is supposed that three negative pulses arrive simultaneously at the inputs EA, EB and EC at the beginning of a binary period.

At the beginning of that period, that is at time 0 the timing pulse (negative) has no action on 20, 21 or 40, which are already in state "0," and cannot pass gates 22, 23 or 42, which are set in the blocking condition by the aforementioned trigger units. 20 thereafter reverses to state "1" at time $3t$ in the binary period, and returns to state 0 at time $4t$, while sending forth a pulse (negative) to 33, which reverses 21 to "1" at the same instant. At time $5t$, 20 returns to "1" for the second time. At the beginning of the following binary period (at time $6t$), the negative timing pulse is stopped by 42 (40 being in state "0"), but crosses 22 and 23 (triggers 20 and 21 being in state "1"), thus producing a pulse at $S(A+B+C)$ and a carry-over pulse, which at time $2t$ of said following binary period, reaches the input of trigger 20 by way of 31, changing it to state "1." Supposing that no other pulse reaches the single input of trigger 20 during this period, the timing pulse produced at ET at the beginning of the second binary period, only crosses gate 22, in order to send a pulse to $S(A+B+C)$. The result is therefore the binary representation of $3(1-1)$ with a lag of one binary period $p$ in relation to the corresponding binary input pulses.

With the help of other examples of problems it could be seen that in the course of the addition of three numbers A (3), B (3) and C (2), for instance, the trigger 20 receives four pulses during the second binary period of operation, namely a carry-over pulse arriving through 31 at time $2t$, and three pulses for the numbers A, B, C through 25, 26, 38 respectively at times $3t$, $4t$, $5t$. The receipt at trigger 20 of the fourth pulse at time $5t$ causes triggers 20 and 21 to be reset to the state zero, while a resulting negative pulse appearing at 39, sets trigger 40 to state 1. The following timing pulse emitted at the beginning of the binary period 3, only finds the gate-circuit 42 in the unblocking condition. The resulting pulse, after having passed through delay element 43 and wire 44, reaches the single input of trigger 20, and switches the latter to state 1 at time $1t$ of the binary period 4. If no other pulse is received during this period, thereafter at the beginning of the binary period 5, the trigger 20 alone is still at state 1, and gate-circuit 22 is unblocked so that the timing pulse occurring at this instant crosses this gate-circuit to form on output terminal $S(A+B+C)$ a result pulse of value 8.

As the operand and carry-over pulses may occur at random, the single input of trigger 20 may receive up to 5 pulses during one binary period. In addition operators, such as that of Fig. 1a, which operates as a pulse counter periodically reset to zero, any of the pulses received at the trigger input should not be simultaneous, either with each other or with any timing pulse. If the greatest number of pulses liable to be applied in a binary period is $n$, it is convenient to define $n+1$ possible instants for the occurrence of pulses, preferably spaced by a time $t$ equal to $p/n+1$ and at least equal to twice the width of each pulse received.

The multiplying device of Fig. 1 embodies a three-term addition operator similar to that of Fig. 1a, except for changes relative to some selectively controllable input circuits. The multiplying device of Fig. 1 is provided with a sole input terminal E. A transmission line 25, 26, 38, 55 is connected to said terminal E and is connected to the trigger unit 20 by a four-branch network. The four branches 30, 29, 45 and 50 respectively include gate-circuits 51, 52, 53 and 54. The four delay elements 25, 26, 38 and 55 respectively have delay time values of $3t$, $(p+t)$, $(p+t)$ and $p$, $p$ being the duration of a binary period and $t$ being equal to $p/6$, in accordance with the block-diagram of Fig. 1a. In the arrangement of Fig. 1, the delay elements 25, 26, 38, 55 are essentially intended to deliver at their respective output terminals impulses representing sub-products differently delayed with respect to the time origin valid for the multiplicand-representing pulses applied to the input E of the multiplying device.

These delay elements being serially connected, the pulses available at the right hand terminal of the elements 25, 26, 38 and 55 are respectively delayed by $3t$, $(p+4t)$, $(2p+5t)$ and $(3p+5t)$ for representing the value of the entered multiplicand multiplied by 1, 2, 4 and 8 respectively. If the integral numbers of binary periods of delays $p$, $2p$ and $3p$ are neglected, it may be seen that the fractional delays $3t$, $4t$ and $5t$ are intended, as in the addition operator of Fig. 1a, to ensure that all the possible pulses to be transmitted to the input of trigger 20 will not interfere within any binary period.

The control circuits of gate-circuits 51—54 are directly connected to control terminals 1, 2, 4 and 8. They also are indirectly connected to control terminals 3, 5, 6, 7, 9, 10 and 11 through rectifier cells. The control terminals 1 to 11 may be selectively set under a positive voltage adapted, when applied to the control circuit of one of said gate-circuits, to set the latter in a pulse transmitting condition. Any known means can be used to supply the selective setting under voltage of the terminals 1 to 11. As they can be cam-contacts, relay-contacts, trigger units or the like, they have not been represented on the drawing.

The rectifier cells, or unidirectional conducting elements, are connected to carry out the binary codifying of the decimal multiplier numbers 1 to 11. For instance, if the terminal 7 is set under voltage, four rectifier cells permit the transmission of this voltage to the control circuits of the gate-circuits 51, 52 and 53, thus setting them in a pulse transmitting condition to represent the binary components 1, 2 and 4.

The unidirectional connections between terminals 1, 2, 4 and 8 and terminals 3, 5, 6, 7, 9, 10 and 11, which are necessary for transmitting the proper voltages to the said gate-circuits, may be achieved for example, by means of selenium or diode rectifiers. The other component parts of the multiplying device, which includes three triggers 20, 21 and 40, three gates 22, 23 and 42, and two delay elements 24 and 43, assembled as shown in the Figure 1, are identical in all points to the corresponding parts of the addition operator described in Fig. 1a, and operate in a like manner, sending the pulses resulting from the multiplication with a delay equal to the binary period $p$ to the one output S (the arrows indicate the circulation direction of the pulses).

Let us take as an example, the multiplication of a multiplicand binary digit 1 by any multiplier number from 1 to 9.

In the case of the multiplication by 1, the setting under positive voltage of the control terminal 1 sets the gate-circuit 51 into a pulse transmitting condition. The pulse representing this binary digit 1 is retarded by a $3t$ time after having gone through element 25 and is transmitted to the single input of trigger 20 through wire 30 and gate-circuit 51. The same pulse, after having passed through elements 26, 38 and 55 is not transmitted by gate-circuits 52, 53 and 54 in the blocking condition. The transmitted pulse sets trigger 20 into state 1 and the following timing pulse entering by T is transmitted through 22 to output S at the beginning of the second binary period to constitute the result 1 of the multiplication.

In the case of the multiplication by 2, the input pulse, transmitted from the delay element 26 through gate-circuit 52, sets trigger 20 into state 1 at a time $4t$ during the second binary period. The following timing pulse is transmitted to output S at the beginning of the third binary period to constitute the result 2 of the multiplication.

In the case of the multiplication by 4, the input pulse, transmitted from the delay element 38 through gate-circuit 53, sets trigger 20 into state 1 at a time $5t$ during the third binary period. The following timing pulse is transmitted to output S at the beginning of the fourth binary period, to constitute the result 4 of the multiplication.

In the case of the multiplication by 8, the input pulse, transmitted from the delay-element 55 through gate-circuit 54, sets trigger 20 into state 1 at a time $5t$ during the fourth binary period. The following timing pulse is transmitted to output S at the beginning of the fifth binary period, to constitute the result 8 of the multiplication.

In all the foregoing cases of multiplication, as also in the following ones, the output pulses are delayed, with respect to the input pulses, by a number of binary periods equal to the number of binary periods of time shift theoretically necessary increased by one binary period $p$ due to the inherent delay time of the addition operator used.

For multiplication by 3, gates 51 and 52 are simultaneously set into a pulse transmitting condition, a pulse in binary order "1" and a pulse in binary order "2" (binary representation for 3) appear at S with the correct delay times plus the delay time $p$ peculiar to the device. In a like manner, multiplications by 5, 6 and 9 are combinations of multiplications by 1+4, 2+4 and 1+8.

Multiplication by 7, by putting 51, 52 and 53 under voltage, produces the binary representation 7 (1-1-1) at S, coded in the time, plus the delay time $p$, peculiar to the device.

Figure 1B:
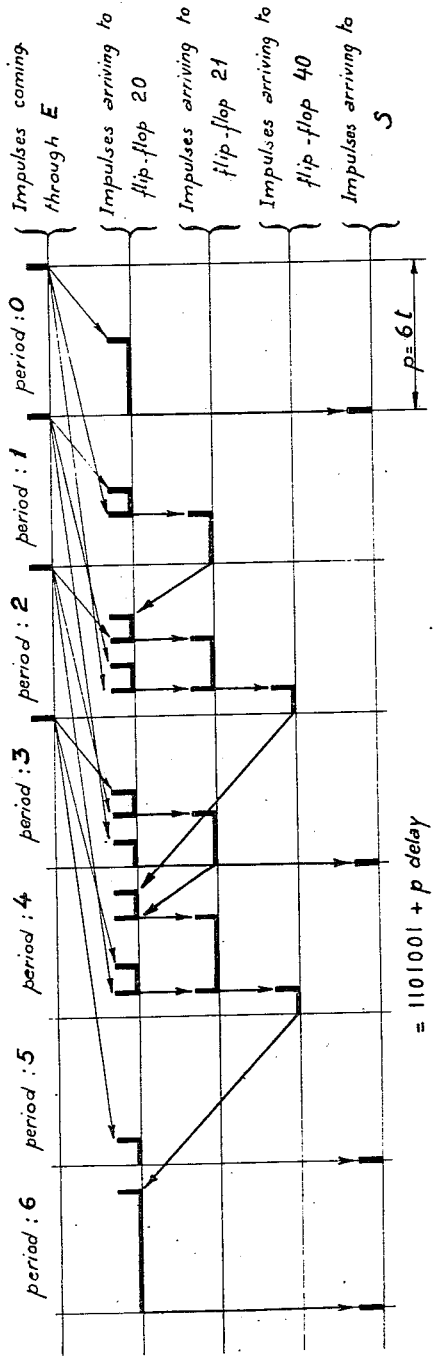
Fig. 1b is a time chart for explaining the operation of the device of Fig. 1.

In the time chart of Fig. 1b the number of pulses arriving at E is assumed to be equal to 4 (1-1-1-1= binary representation of 15). The decimal multiplier number is assumed to be 7, in order to explain a multiplication which involves the greatest number of gate circuits into operation. Other multiplications, being simpler, can therefore be easily understood from this example.

As the gates 51, 52, 53 are now in pulse transmitting condition, each pulse entering E produces three pulses at the input of trigger 20 with the following delays: $3t$, $p+4t$, $2p+5t$. If carry-over pulses arriving by way of 31 and 44 are neglected for the moment, the following pulses arrive at trigger 20:

At the binary period 0: one pulse at time $3t$.
At the binary period 1: two pulses at times $3t$ and $4t$ respectively.
At the binary period 2: three pulses at times $3t$, $4t$ and $5t$.
At the binary period 3: three pulses at times $3t$, $4t$ and $5t$.
At the binary period 4: two pulses at times $4t$ and $5t$.
At the binary period 5: one pulse at time $5t$.

The effect of the foregoing is to produce:

At binary period 0: no carry-over pulse and one pulse at S produced by the timing pulse received, at the beginning of period 1, this timing pulse zeroizing trigger 20.

At binary period 1: one carry-over pulse which arrives at trigger 20 at instant $2t$ of binary period 2 and no pulse at S at the beginning of period 2.

At binary period 2, the carry-over pulse at time $2t$ together with the pulses at times $3t$, $4t$ and $5t$, reverse trigger 21 twice, thereby zeroizing it, which in turn causes the reversing of trigger 40, allowing the timing pulse to produce one carry-over pulse, which arrives at instant $t$ of binary period 4. The timing pulse zeroizes the trigger unit 40. There is no pulse at S at the beginning of binary period 3.

At binary period 3: one carry-over pulse which is transmitted through gate 23, controlled by trigger 21, at instant $2t$ of the binary period 4, and one pulse at S at the beginning of binary period 4.

At binary period 4: two carry-over pulses reverse twice trigger 21, which is therefore zeroized, while sending out a pulse which reverses 40, which in turn sends out a carry-over pulse which arrives at instant $t$ of binary period 6. There is no pulse at S at the beginning of binary period 5.

At binary period 5: no carry-over pulse and one pulse at S at the beginning of binary period 6.

At binary period 6: no carry-over pulse and one pulse at S at the beginning of the following binary period.

Since the inherent delay time $p$ of the multiplying device (Fig. 1) is taken into account as not intervening in the multiplication process, the result obtained at S is in binary codification: 1101001 which is the representation of the decimal number 105 and is the correct result of multiplying 15 by 7.

The connections which allow for an economical realization of multiplications by 10 and 11 are 10a, 10b, 10c, 11a, 11b, 11c in Fig. 1. The multiplier values 10 and 11 may be of interest in relation to accounting machines for record cards where they may be found recorded in a card line.

The voltage appearing at control terminals 1 to 11 of Figure 1 may also be supplied by the scanning brushes of a tabulating machine as they pass over the perforations or marks on a record card.

Figure 2A:
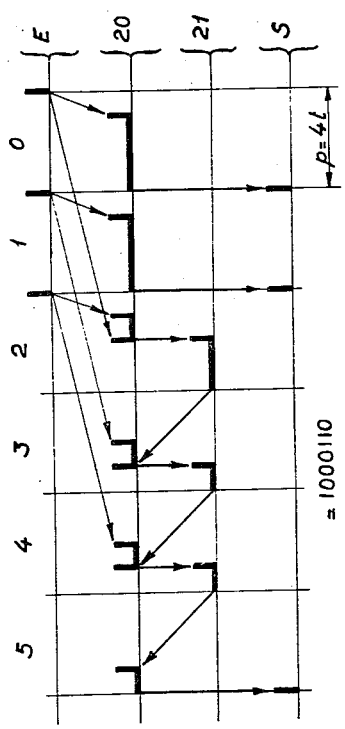
Fig. 2a is a time chart for explaining the working of the said decupler.

It is worth noting that if it were not for the possibility of multiplication by 7, it would only be necessary to use an addition operator with two trigger units similar to the one described in Figure 2.

The Fig. 2 of the appended drawings illustrates a multiplying device for the multiplication of binary numbers by 10 and constituting what is called, for the sake of brevity, a "decupler." This device is composed of a two-stage addition operator which essentially comprises two trigger circuits 20 and 21, two gate-circuits 22 and 23, a delay element 24 for conveying the internal carry-over pulses, two distinct input channels 29 and 30, which include two delay elements 25 and 26. Two rectifier cells or diodes 55 and 56 are provided for preventing the establishment of back-circuits for negative pulses.

With this addition operator, at least four pulse intervals should be defined. This is why the unit of delay time $t$ is taken here as being equal to $p/4$.

The multiplicand pulses, after having passed through delay elements 26, are led through wire 29 to the single input of trigger 20, where they represent the multiplicand multiplied by 1, since the delay time $t$ is smaller than the duration of one binary period. The same multiplicand pulses, after having serially passed through delay elements 26 and 25 and wire 30 are led, with a delay time of $2p+2t$ to the single input of trigger 20, where they represent four times the multiplicand.

Then the addition operator has only to add the values of the 1 and 4 multiples of the multiplicand for constituting the product of the multiplicand multiplied by $(2^0+2^2)$, that is, by 5.

It may be observed that in arrangements like those of Figs. 1, 1a and 2, a first pulse of value 1, applied on the input terminal at the beginning of a given binary period, gives rise to a first output pulse also of value 1 appearing at the beginning of the following binary period. Now, if specially when employing the multiplying device of Fig. 2, the first output pulse appearing at output S is considered and used as being of value 2, and so on for the other pulses, the inherent delay time $p$ of the device is utilized to perform a further multiplication by $(2^1)$, or by 2, of the 5 multiple of the multiplicand.

With the foregoing assumption, it can be said that the product-representing pulses are not time shifted or delayed with respect to pulses of equivalent binary values in the multiplicand input pulses.

Taking as an example (Fig. 2a) 3 consecutive pulses arriving at E (binary representation for 7), the following occurs at trigger 20, taking possible carry-over pulses into account:

At binary period 0: one pulse at time $t$;
At binary period 1: one pulse at time $t$;
At binary period 2: one pulse at time $t$ and one pulse at time $2t$;
At binary period 3: one pulse at time $2t$ and one carry-over pulse at time $3t$;
At binary period 4: one pulse at time $2t$ and one carry-over pulse at time $3t$;
At binary period 5: one carry-over pulse at time $3t$.

The different states of trigger 20 allows the following to arrive at S at the corresponding times, that is:

At the beginning of binary period 1:1 pulse
At the beginning of binary period 2:1 pulse
At the beginning of binary period 3:0 pulse
At the beginning of binary period 4:0 pulse
At the beginning of binary period 5:0 pulse
At the beginning of binary period 6:1 pulse, 1000110 being in effect the binary representation for 70.

Figure 3 represents a multiplying device for multiplication by 100 (centupler), which uses an addition operator with a period $p=6t$; and a three stage binary adder similar to that of Fig. 1a. This multiplication is achieved by the intermediary of the three branch circuits 30, 29 and 45, on which the delay elements 25, 26 and 38 are placed which besides the delays $3t$, $4t$ and $5t$, necessary for the functioning of this operator, produces, by combination, the delays $p$, $4p$ and $5p$. The multiplication $[(\times 2^1)+(\times 2^4)+(\times 2^5)]$ $(\times 2^1)=(\times 100)$ is therefore obtained by making in this case the same assumption about the time origin adopted for evaluating the product pulses as that which is hereinabove stated for the decupler. Three unidirectional elements 55, 56 and 57 are inserted in 29, 30 and 45 respectively, in order to prevent the return of negative pulses by way of the connections between 29, 30 and 45 relative to trigger 20.

The functioning of this multiplication device is similar to the functioning of the device shown in Fig. 2; there is therefore no need for any special explanation. The illustrating time chart shown in Fig. 3a corresponds to the multiplication of —1—1 (binary representation for 3) by 100 in the centupler in question.

Figure 4:
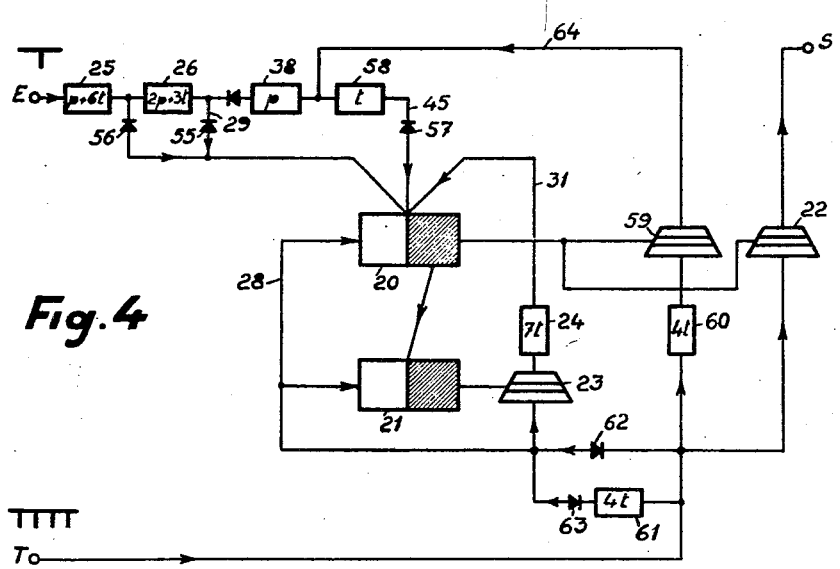
Fig. 4 shows a centupler according to a second embodiment.

In using a special realization of the centupler, represented by Fig. 4 of the present invention it is possible to simplify the design, by using a modified two trigger addition operator, on condition that the binary period be divided into 8 parts ($p=8t$), the operator executing two successive additions in a binary period without any confusion, this being made possible by a doubling of the timing signal, which zeroizes the triggers.

Towards this end, period $p$ is divided into two parts each equal to $4t$. A designating the multiplicand and P the product, for the first half of the binary period the operator carries out the product $A [2^4+2^5]=C$. In the second half it calculates $(C+2A)2=D\times2=P$. The multiplication of D by 2 results from the fact that the time origin adopted for evaluating the values of the product pulses coincides with the time origin related to the pulses delivered by the input E. The first clock pulse, produced at time 0, is indeed blocked by the gate 22 by reason of the fact that the trigger unit 20 is at the same time in position 0. In this way, the following multiplication is obtained:

$$[(\times 2^4)+(\times 2^5)+(\times 2^1)](\times 2^1)=(\times 100)$$

without the $p$ delay mentioned, in describing the Fig. 1. In the first part of the period, the channels 29, 45 and 31 correspond to the distinct arrival of pulses corresponding respectively to $2^4$, $2^5$, and to the carry-over staggered in the said period by $t$, $2t$ and $3t$ respectively: indeed, if it arrives by 45, the pulse undergoes a delay of:

$$p+6t+2p+3t+p+t=4p+10t=5p+2t$$

and if by 29: $p+6t+2p+3t=3p+9t=4p+t$.

Moreover, the timing pulse passes by two channels; the one passing across delay element 61 and rectifier 63 arrives at time $4t$ and resets the triggers to 0. 59 is a gate controlled by 20 which can allow the timing pulse, passing through element 60, to pass only at time $4t$; this pulse is directed to trigger 20 by connection 64 through delay element 58, and can arrive in this way in this trigger unit for the second half of each binary period with a delay $(t+4t)$. The triggering effect of this pulse is eventually combined with that of a pulse coming through 56 at time $6t$ and with that of a carry-over pulse delivered at time $7t$ by the delay line 24. Output pulses can leave by the output terminal S through the gate 22, only at the instants of production of the timing pulses. By way of a non-limitative example, Fig. 4a shows the multiplication process of —1—1—1— (binary representation for 7) by this kind of centupler.

Figure 5A:
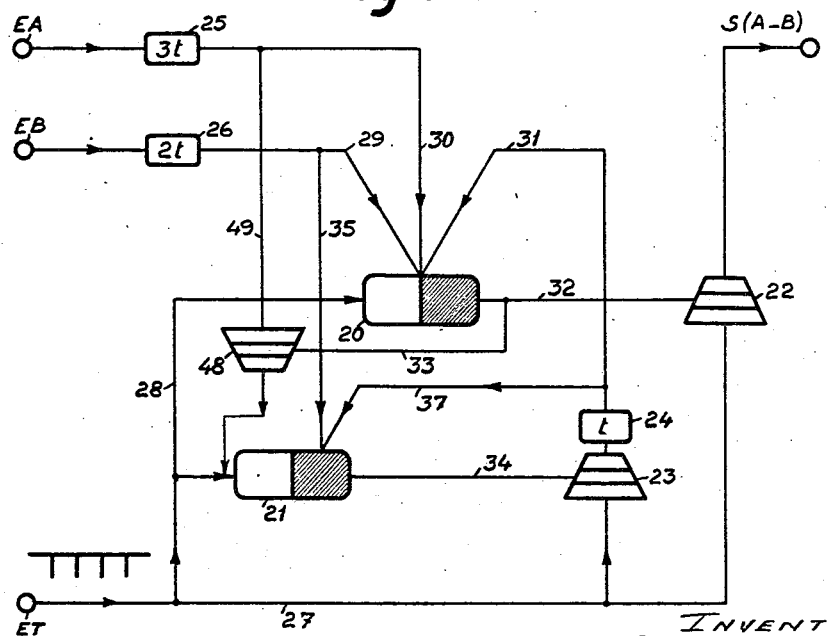
Fig. 5a represents a subtraction operator of known type used in the multiplication device shown in Fig. 5.
Figure 5:
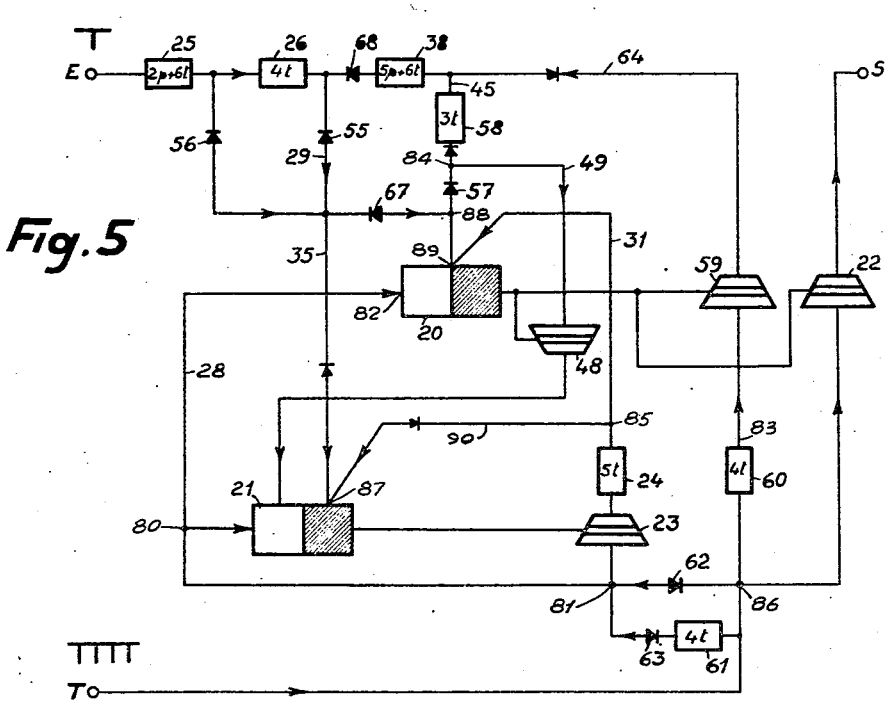
Fig. 5 shows a multiplying device for multiplication by 1000 (miltupler).

Fig. 5 represents a multiplying device for the multiplication by 1000 (miltupler) based on a principle similar to the one used for the centupler shown in Fig. 4, but working by means of a sequence of two subtractions repeated as many times as necessary. Each subtraction requires a time $4t$, the binary period being again divided into $8t$.

The known subtraction operator represented by the Fig. 5a includes a two-stage binary subtractor, wherein each trigger 20 and 21 controls one of the gates 22 and 23 respectively. These two triggers are zeroized at the beginning of each binary period $p$, by the negative timing pulse coming from channel 28 to two reset inputs. The two terms A and B of the subtraction arrive at the hereinabove defined single input of trigger 20 in the form of negative pulses, by way of two separate channels 29 and 30 which include respectively two delay lines 26 and 25 having the respective values $2t$ and $3t$. The larger term is issued by the channel 30. Control gate 22, which delivers output pulses representing the result $S(A-B)$, which represents the result of the subtraction, is controlled by trigger 20. The latter controls also the gate 48, which is inserted in the channel 49 and can transmit or block the pulses coming from EA before they arrive upon the reset input of trigger unit 21, which is used by the timing pulses. This trigger 21 controls gate 23, which controls possible carry-over pulses.

The value $t$ of this delay network is chosen in harmony with those of the delay networks 25 and 26 so as to prevent any coincidence in the arrival of pulses coming from 29, 30 and 31, to the trigger unit 20. These delayed pulses are led, on one hand to the single input of trigger 20 through conductor 31, and on the other hand to the set input of trigger 21 through a conductor 37.

A definite example will show the functioning of the subtraction operator in question. For example in the following subtraction: 5 (binary representation 1—0—1)—3 (binary representation 1—1), the pulses representing 5 arrive by EA and those representing 3, by EB.

At time 0 (beginning of the first binary period $p$), the negative timing pulse coming by way of 28 has no effect on 20 or 21, which are already at state "0," and cannot cross gates 22 and 23, which are blocked by the said triggers. At time $2t$, the negative pulse coming from EB, arrives at triggers 20 and 21, and sets them both to state "1." At time $3t$, the negative pulse coming from EA, crosses gate 48 (20 being in state "1"), and resets 21 to "0" as well as 20, by way of connection 30. At the beginning of the second binary period the timing pulse delivered by the terminal ET has no effect on 20 or 21 and cannot cross 22 or 23 which are blocked. There is no pulse at $S(A-B)$ at the beginning of the second binary period. At time $2t$ in this second binary period, an impulse coming from EB reverses 20 and 21, putting them into state "1." At the beginning ($t1$) of the third binary period, a timing pulse therefore crosses 22 and produces a pulse at $S(A-B)$. At the same instant, this timing pulse crosses the gate 23. At the time $(t1+t)$ it reaches the trigger units 20 and 21 and puts them into state 1 (20 and 21 having been zeroized by the timing pulse produced at the beginning of the third period). At time $3t$ of the same period, the binary pulse coming from EA whose value is 4, arrives at 20 and 21 (48 is open, since 20 is in state "1") setting them back to "0." At the beginning of the fourth binary period, the timing pulse cannot cross 22 and 23. No pulse arrives at $S(A-B)$. The result of the subtraction is therefore, with a lag of one binary period p, in relation to the input pulses, a pulse in the binary rank 2. The subtraction 5—3=2 has been executed.

Coming back to the miltupler, shown in Fig. 5, its operation will be explained.

As is shown hereinafter, the miltupler executes during the first half of each binary period, a stage of the multiplication $Ax (2^9-2^3)=B$. The time origin is admitted to coincide with the beginning of the first period, so that the beginning of the period $(s+1)$ occurs at a time $sp$.

The trigger unit 20 can indeed receive, at a time $2t$ after the beginning of this first half, through the channel 25, 26, 55, 67, 89 a pulse representing a binary component of the number $A\times 2^3=F$. As the total delay imparted to pulses by the channel 25, 26, 38, 45, 58 is equal to: $2p+6t+4t+5p+6t+3t=9p+3t$, the said trigger unit is also adapted to receive, at a time $3t$ after the beginning of such a first half, a binary digit of the number $$G=A\times 2^9$$

On the other hand, it can receive, at a time $t$ after the beginning of this first half, a carry-over pulse through the channel T—61—81—23—24—28—31—89, which delays each timing pulse by $4t+5t=9t$. Supposing that the numbers F and G both have a binary component $2^s$ and that no carry-over was formed during the first half of the past period $s$, at the end of the first half of the binary period $(s+1)$ the trigger unit 20 is in position 0, for $2^s-2^s=0$. Therefore no result pulse can be received by said unit at the time $(sp+7t)$ through the channel 86, 60, 59, 64, 58, 88 but it is supposed to receive, at the time $(sp+6t)$, through the channel 56, 67, 88, 89, a pulse representing the binary component $2^s$ of the number $A \times 2^2$. This component is subtracted from $2.2^s$ and gives rise to an output pulse and to a carry-over pulse (gate 23 open), which is received by trigger 20 at time $$[(s+1)p+5t]$$

If the number $G=A \times 2^9$ has alone a binary component $2^s$ and there is no carry-over of value $2^s$, at the end of the first half of the binary period $(s+1)$ the trigger units 20 and 21 are respectively in positions 1 and 0. Consequently a result pulse, led by the channel 60, 59, 64, 58, 57 reaches the symmetrical input 89 at the time $(sp+7t)$ and there is no output pulse at time $(s+1)p$, for $$2^s - 2^s = 0$$

It can be said that the subtraction of the number H from $(G-F)$ is carried out during the second half of said period, as regards the binary components of rank $s$. The output terminal of the device of Fig. 5 delivers therefore pulses representing $2 \times (G-F-H) = A \times 1000 = C$ if it is admitted that the time origins adopted for evaluating the pulses of the multiplication terms and those of the product coincide.

The arrangement of Fig. 5 therefore has many parts in common with that of Fig. 4 and the corresponding elements are designated by the same reference numbers.

Figure 5B:
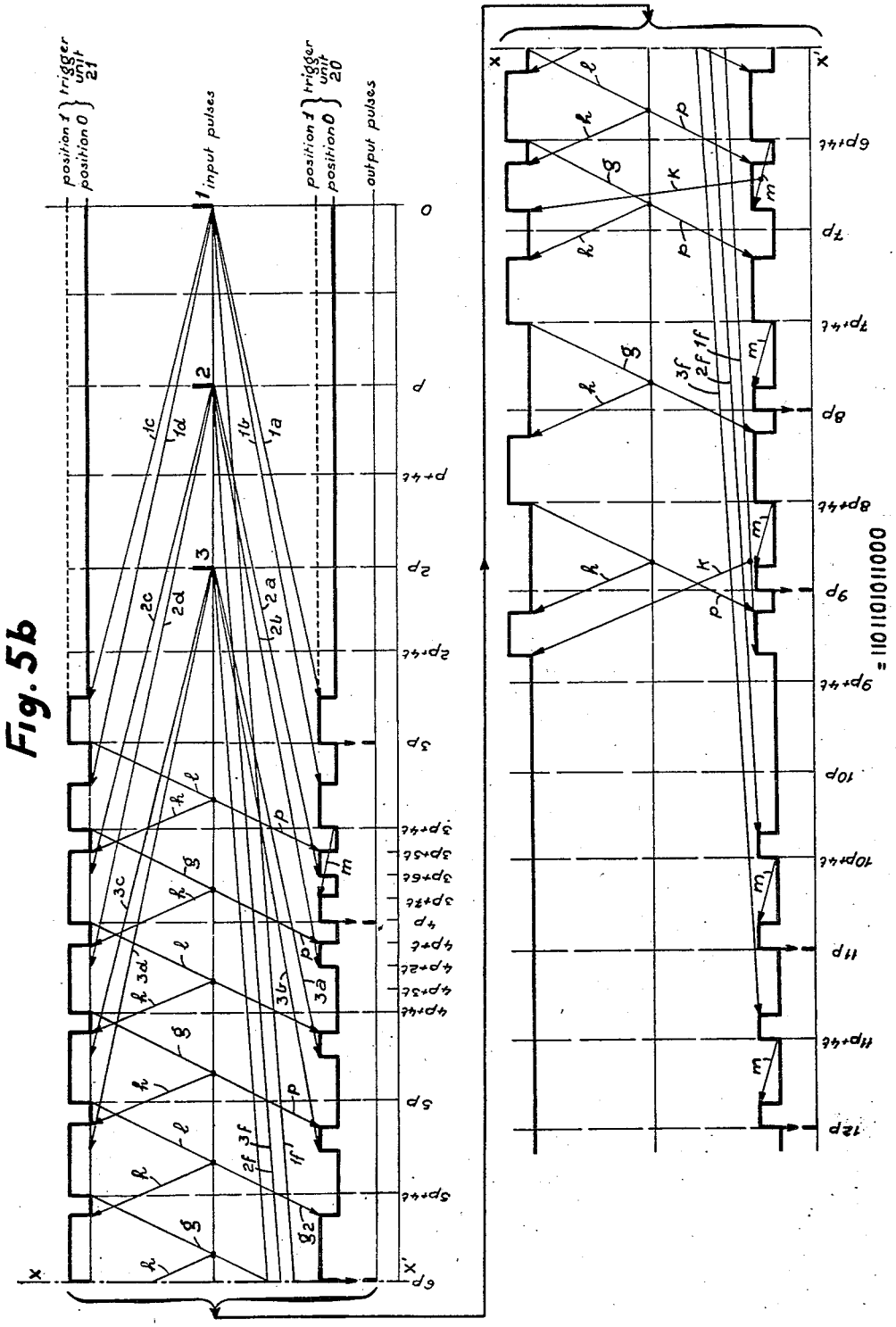
Fig. 5b is a time chart for explaining the working of this miltupler.

As a non-limitative example Fig. 5b represents the multiplication process of $-1-1-1-$ (binary representation for 7) by 1000 in such a miltupler.

In this diagram, like in the others heretofore described, the abscissae represent the operation times counted from an instant zero, which marks the beginning of the first binary period. At that instant a negative pulse having the value 1 can be emitted by the terminal E. This diagram shows the instantaneous positions of triggers 20 and 21, the production times of the pulses delivered by the terminal E and those relating to the output pulses, delivered by the terminal S. On account of its length, it is cut into two parts. The arrows which connect with one another some elements of the two toothed lines or those which connect points of the middle horizontal line with said toothed lines bear reference characters $nq$.

$n$ designates the numeral of an input impulse,
$q$ a path followed by this pulse to reach a trigger unit.
$1a$ designates the path 25—56—88—89 followed by input pulse 1.
$1b$ designates the path 25—26—55—57—88—89 followed by input pulse 1.
$1f$ designates the path 25—26—38—58—57—89 followed by input pulse 1.
$c$ designates the path 25—56—35—87.
$d$ designates the path 25—26—55—35—87.

To the paths $a$ and $e$ correspond a delay $(2p+6t)$ sec.
To the paths $b$ and $d$ correspond a delay $(3p+2t)$ sec.
To the path $f$ corresponds a delay $(9p+3t)$ sec.
The input pulse 2 represents $2°$.
$g$ is the path T—61—63—23—24—85.
1 is the path T—86—62—81—23—24—85.
$p$ is the path 85—31—89.
$h$ is the path 85—90—87.
$m$ is the path 83—59—64—58—57—88—89.
$K$ is the path 84—49—48—21.
To the path $g$ corresponds a delay $(p+t)$ seconds.
To the path $l$ corresponds a delay $5t$ seconds.
To the path $m$ corresponds a delay $3t$ seconds.
The paths $h$, $p$, $k$ do not comprise delay lines.

The trigger unit 20 being at position zero at time 0 receives at time $(2p+6t)$, through path $a$, the input pulse 1, and is triggered into position 1. At time $3p$ it is brought back in position zero by the negative clock pulse coming at its input 82. A time $(3p+2t)$ it is again set in position 1 by a pulse delivered by the path $b$. It is reset in position zero, at time $(3p+4t)$, by the clock pulse brought home by the path T—61—63—81—80—28—82. At time $(3p+5t)$ it receives a pulse at its input 89, through the path $(1+p)$, and passes into position 1. At time $(3p+6t)$ it receives the input pulse 2, delayed by the path $a$, and is triggered into position 0. At time $(3p+7t)$ it receives through the path $m$ a delayed clock pulse, which sets it in position 1 and it is reset in position zero, at time $4p$, by a clock pulse which is transmitted by the path T—86—81—89—28—82. It is to be noted that the pulses arriving at $(3p+5t)$ and $(3p+6t)$ represent negative components, whilst the pulse supplied at time $(3p+7t)$ represents a positive number. Should this succession order be inverted, the operator would give erroneous results. At the times $3p$ and $4p$ the output terminal S delivers therefore pulses having the respective values 8 and 16. The rest of the diagram is easily understood after the explanations hereinabove given. The pulses collected at the said output S are represented by the binary number 1101101011000, on assuming that the time origins are the same for the product pulses and for the pulses representing the multiplication terms.

The following figures numbered from 6 to 12 are examples of multiplying devices for multiplications by $10^n$ based on similar principles and capable of being realized in every case by means of addition and subtraction operators as described in the foregoing ($n$ assuming the entire positive values of 3 to 9 in these examples). It has been stated before that these multiplications may be obtained by additive and subtractive combinations of multiplications by the powers of 2. Therefore, multiplication by $10^6$, for example, is obtained by the addition of multiplications by $2^{20}$, $2^9$ and $2^6$, and by subsequent subtraction of the multiplications by $2^{15}$ and $2^{14}$. The pulses having crossed the delay elements, which in the time, execute the multiplications by the powers of 2, corresponding to a positive sign and those analogous corresponding to a negative sign, may be added separately. Each of the totals realized by means of one or several addition operators, is then directed towards a subtraction operator.

It is obvious that these multiplications may be arrived at from various groupings of the powers of 2, putting the addition and subtraction operator devices into action either separately or in combination. It goes without saying, that such realizations fall within the scope of the invention.

The delay values of the delay networks mounted in series between the operators and the delays introduced by the latter must be also taken into account. Accordingly, the sum of the delays introduced by the delay networks represents a number of binary periods. This number is equal to the exponent of the greatest power of 2, which is obtainable at the output B in a given multiplication $C \times 10^n$, less the sum of the smallest number of operators that can be traversed by a pulse coming from A to B and the rank of the greatest binary component in the multiplicand C.

In Figures 6 to 12, the operators are represented diagrammatically by rectangles. The addition operators are indicated by AO and the subtraction operators by SO. The unidirectional conductive devices necessary for the correct progression of the pulses, have not been indicated, arrows indicate the directions of the pulse circulations. The operators used in the arrangements of Figs. 6 to 12 are those that are hereinabove described. Consequently they require no special explanation of functions.

Figure 6:
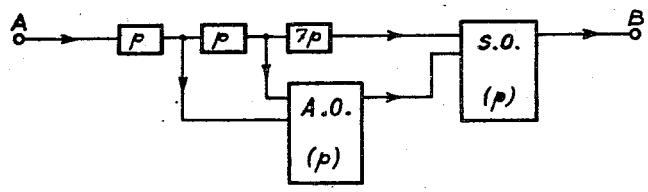
Figs. 6 to 12 illustrate in multiplying devices executing multiplications by $10^n$, where $n$ is equal to 3, 4, 5, 6, 7, 8, 9, successively.

Figure 6 concerns multiplication by $10^3$ (while providing a second embodiment of a miltupler). The partial multiplications taken are multiplications by $2^{10}$, $2^4$ and $2^3$ grouped as follows:

$$(\times 2^{10}) - [(\times 2^4) + (\times 2^3)]$$

An addition operator having two input terminals, and a subtraction operator are used.

The corresponding delays are obtained respectively by:

$$p+p+7p+p \text{ (S. O.) for } 10p$$
$$p+p+p \text{ (A. O.)}+p \text{ (S. O.) for } 4p$$
$$p+p \text{ (A. O.)}+p \text{ (S. O.) for } 3p$$

Figure 7:
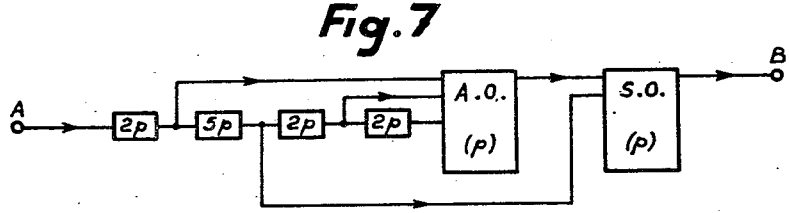

Fig. 7 applies to cases of multiplication by $10^4$, which is arrived at by:

$$\times [(2^{13}+2^{11}+2^4)-2^8]$$

An addition operator having three inputs, and a subtraction operator are used.

The delays are obtained in the following manner:

$$2p+5p+2p+2p+p \text{ (A. O.)}+p \text{ (S. O.) for } 13p$$
$$2p+5p+2p+p \text{ (A. O.)}+p \text{ (S. O.) for } 11p$$
$$2p+5p+p \text{ (S. O.) for } 8p$$
$$2p+p \text{ (A. O.)}+p \text{ (S. O.) for } 4p$$

Figure 8:
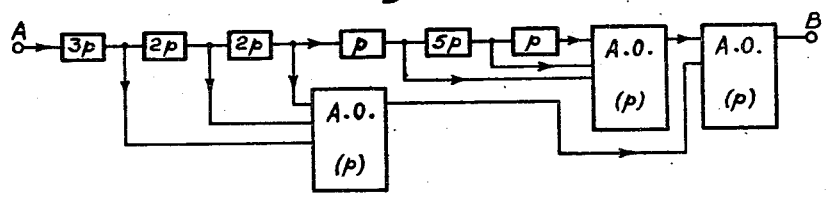

Fig. 8 applies to cases of multiplication by $10^5$, which is arrived at by:

$$\times (2^{16}+2^{15}+2^{10}+2^9+2^7+2^5)$$

Two addition operators having each three inputs and one addition operator having two inputs are used, and the delays are obtained as has already been mentioned above.

Figure 9:
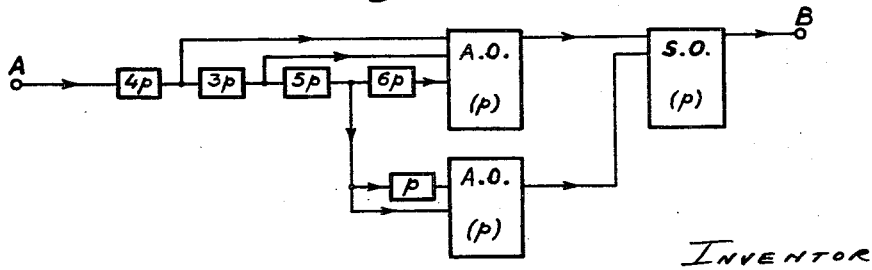

In the diagram of Fig. 9, multiplication by $10^6$ is arrived at by:

$$\times [2^{20}+2^9+2^6)-(2^{15}+2^{14})]$$

with one addition operator having two inputs, one addition operator having three inputs and one subtraction operator.

Figure 10:
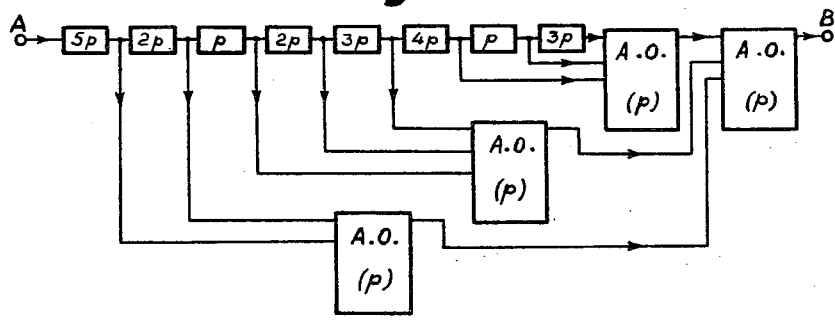

In the diagram of Fig. 10, multiplication by $10^7$ is arrived at by:

$$\times [(2^{23}+2^{20}+2^{19}+2^{15}+2^{12}+2^{10}+2^9+2^7)]$$

with three addition operators having three inputs, and one addition operator having two inputs.

Figure 11:
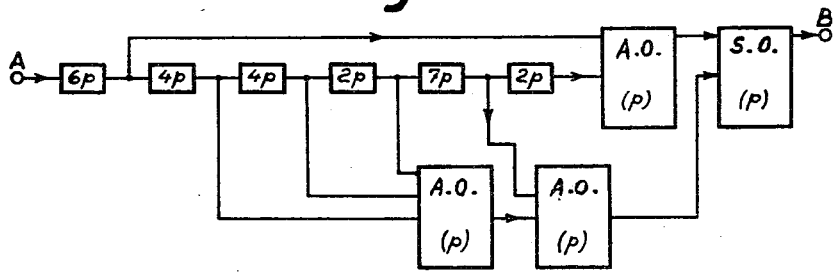

In the diagram of Fig. 11, multiplication by $10^8$ is arrived at by:

$$\times [(2^{27}+2^8)-(2^{25}+2^{19}+2^{17}+2^{13})]$$

with one addition operator having three inputs, two addition operators having each two inputs, and one subtraction operator.

Figure 12:
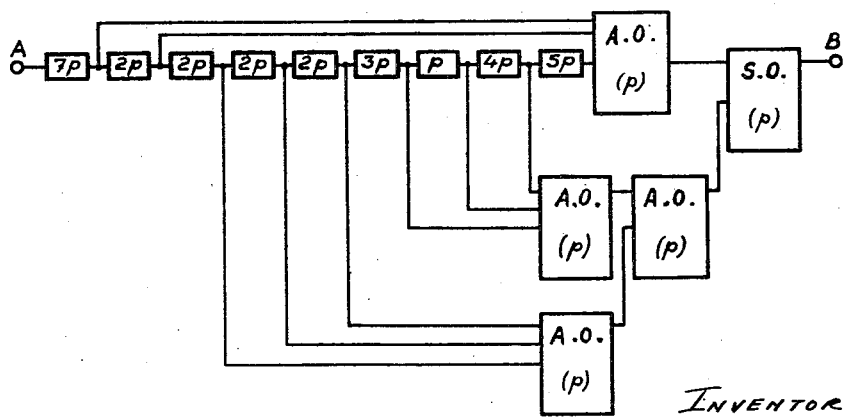

In the diagram of Fig. 12, multiplication by $10^9$ is arrived at by:

$$\times [(2^{30}+2^{11}+2^9)-(2^{26}+2^{22}+2^{21}+2^{18}+2^{16}+2^{14})]$$

with three addition operators having each three inputs, one addition operator having two inputs, and one subtraction operator.

It is obvious that all multiplications by $10^n$, arrived at by means of the principles explained above fall within the domain of this invention for any value of $n$ whatsoever.

Moreover, generally speaking, it is more advisable to use the various multiplying devices in series, by 1, 2, etc . . . 9 decuplers, centuplers and miltuplers, here described (Figs. 1, 2, 4 and 5), in order to arrive at the desired multiplications in the most economical way. It will be recalled that the multiplying device of Fig. 1 creates a delay of one binary period, which is not accounted for in the evaluation of the product. On the contrary in the other multiplying devices, the characteristic delay of the operator is used for the multiplication operation.

What is claimed is:

1. In a computing apparatus for multiplying a multiplicand expressed in the binary system and represented by an initial time spaced pulse train by a decimal multiplier, the combination of a serial adding operator comprising at least two bi-stable trigger stages, which separately assume a "1" condition or a "0" condition and connected to form a pulse operated binary adder for summing the pulses applied at an input terminal of the first trigger stage, an output terminal of the second trigger stage having a carry connection including a delay network to said input terminal of the first trigger stage, a control input terminal and conductors connected to a reset input terminal of each of said trigger stages for applying thereto control pulses to delimit binary periods and reset the trigger stages at each binary time space; a plurality of parallel input circuits having delay elements between a multiplicand input terminal of the apparatus and said input terminal of the first trigger stage, each delay element being adapted to delay the initial pulse train applied to the input terminal of the apparatus by a different fraction of a binary time space and a multiple of a binary time space, these multiples being chosen according to the binary components of the multiplier.

2. In a computing apparatus for multiplying a multiplicand represented in the binary system by an initial pulse train by a decimal multiplier from 1 to 11, the combination set forth in claim 1 wherein are provided a plurality of control switching devices, each associated with one of said circuits and each under control of a conductor which may be energized to represent a distinct binary component of the multiplier, whereby the switching devices are selectively rendered operative according to the binary components present in the multiplier for permitting only the transmission of the delayed pulse trains corresponding to said binary components to the input terminal of the first trigger stage.

3. In a computing apparatus for multiplying a multiplicand represented in the binary system by an initial pulse train by a multiplier in form of $10^n$, with $n$ at least equal to 1, the combination set form in claim 1, in which said delay elements are adapted so that the different delayed pulse trains represent, after addition by the binary adder the multiplicand value multiplied by half the value of the multiplier, the operator having an inherent delay of one binary time space used for the multiplication by 2 so that the output pulse train represent the multiplicand multiplied by $10^n$.

4. In a computing apparatus for multiplying a multiplicand represented in the binary system by an initial pulse train by a multiplier equal to a power of ten ($10^n$) resolvable into several binary components, some of them being positive and other negative, the combination set forth in claim 1, in which is provided a subtraction operator associated with at least one delay element inserted in one of its input channels, the other input channel being connected to the output terminal of said binary adder, the arrangement being adapted so that the pulse trains to form the final product are combined, some by additive operations and others by subtractive operations according as the corresponding binary components of the multiplier are positive or negative.

References Cited in the file of this patent

UNITED STATES PATENTS

| | | |
|---|---|---|
| 2,404,047 | Flory | July 16, 1946 |
| 2,429,228 | Herbst | Oct. 21, 1947 |

FOREIGN PATENTS

| | | |
|---|---|---|
| 667,794 | Great Britain | Mar. 5, 1952 |
| 1,003,996 | France | Nov. 21, 1951 |

OTHER REFERENCES

"High Speed Computing Machinery" by Engineering Research Associates, McGraw-Hill Book Co., pages 295 through 301, seven pages; 1950.

"A Functional Description of the EDVAC," Univ. of Pa., Philadelphia, Pa., vol. I (pages 4–18 to 4–24, seven pages) vol. II (dwg. 104–3LD–2), November, 1949.

Theory and Technique for Design of Electronic Digital Computer Moore School of Elec. Engr., Univ. of Pa. (pages 47–9 through 47–12 and drawing 47–14, 5 pages complete).

Electronic Engineering, "The Physical Realization of an Electronic Digital Computer" by A. D. Booth, pages 492 to 498, seven pages, December, 1950.